Patented Dec. 7, 1943

2,335,908

UNITED STATES PATENT OFFICE 2,335,908

IMPREGNATING AND COATING COMPOSITION AND METHOD OF PRODUCTION

Joseph N. Borglin, Wilmington, Del., assignor to Hercules Powder Company, Wilmington, Del., a corporation of Delaware No Drawing. Application December 19, 1942, Serial No. 469,553

15 Claims. (Cl. 106—237)

This invention relates to impregnating and coating compositions, and to a method for their production. The invention also relates to articles of manufacture impregnated or coated with such compositions, and to a method for the production of such articles of manufacture.

It is sometimes desirable to impregnate certain porous materials such as wood, wallboard, heavy cardboard, etc., with solutions of partially neutralized wood rosin to improve the heat and electrical insulating properties of the materials, to act as a preservative for the materials, to give added structural strength to the materials, etc. Solutions of rosin size are also useful in providing novel coatings for metallic and other nonporous surfaces. Such solutions of wood rosin size may be employed in accordance with procedures well known in the art for the impregnation and coating of various objects. However, solutions of wood rosin size in water exhibit an objectionable tendency to form a precipitate of 3:1 salt (a water-insoluble double salt consisting of 3 molecules of abietic acid and 1 molecule of alkali metal abietate) which tends to retard the impregnation of a porous object, and also imparts a rough surface to a coated object. Furthermore, this precipitate of 3:1 salt greatly reduces the amount of rosin introduced into or coated upon an object, since the precipitate cannot again be dissolved in the solution of wood rosin size.

Now, in accordance with this invention, it has been found that by employing an aqueous solution of wood rosin size containing a water-miscible alcohol or ketone and a dammar gum, the formation of 3:1 salt is almost entirely eliminated. More particularly, the improved impregnating and coating compositions comprise a wood rosin which has been partially neutralized with an alkaline sodium compound to the extent of from about 10 to about 90%, from about 5 to about 50% of water, from about 0.1 to about 10% of a dammar gum, and from about 33 to about 800% of a water-miscible organic solvent, the percentages being based upon the weight of the rosin in the composition. Thus, when these wood rosin size solutions containing a dammar gum and a water-miscible solvent as essential ingredients, are employed as impregnating and coating compositions, an economical method for impregnation and coating, which is entirely free from difficulties caused by 3:1 salt formation, is provided.

Having thus indicated in a general way, the nature and purpose of this invention, the following examples are included to illustrate the method for the preparation of the improved impregnating and coating compositions, and their application to porous and nonporous objects. In the specification and in the claims, the parts and percentages are by weight, unless otherwise indicated.

EXAMPLE 1

Three tenths part of bold scraped Batu gum (an East India dammar) was added to 100 parts of K wood rosin and the mixture blended by heating at 150° C. for about 90 minutes under a nitrogen atmosphere. The mixture was then refluxed with an equal weight of acetone until solution was complete. The solution was then partially cooled and neutralized to the extent of about 25% with 2 normal aqueous sodium hydroxide (about 8%). The partially neutralized solution was then refluxed for about 1 minute and cooled. A few seeds of 3:1 salt were added to the solution to facilitate any crystallization and the solution was agitated at intervals over a 24-hour period. The crystals which formed were then filtered, washed with acetone, dried and weighed. This procedure yielded 0.2 part of 3:1 salt per 50 parts of rosin employed. A comparison experiment was run with 100 parts of the same rosin to which no dammar gum had been added, and 18.5 parts of 3:1 salt per 50 parts of rosin were obtained in this comparison experiment.

The table below illustrates the effect of various dammar gums in inhibiting the formation of 3:1 salt when various rosins and various solvents are employed. In these examples, the procedure followed was the same as that given in Example 1.

Table

| Ex. | Rosin used | Dammar added | Parts dammar per 100 parts of rosin | Solvent | Yield of 3:1 salt gm./50 gm. rosin | |
|---|---|---|---|---|---|---|
| | | | | | Rosin/dammar blend | Comparison |
| 2 | K wood | | | 2B alcohol | 0.1 | 12.4 |
| 3 | ---do--- | No. 1 Singapore dammar | 1.0 | Acetone | | 18.5 |
| 4 | ---do--- | | | 2B alcohol | | 12.4 |
| 5 | ---do--- | Black bold scraped East India resin | 1.0 | Acetone | 0.35 | |
| 6 | ---do--- | | | 2B alcohol | 0.3 | 12.4 |
| 7 | H wood | Pale dammar | 0.3 | Acetone | 0.5 | 17.2 |
| 8 | ---do--- | | 1.0 | ---do--- | 0.1 | 23.6 |
| 9 | ---do--- | Batavia dammar | 0.3 | ---do--- | 0.3 | 18.9 |
| 10 | ---do--- | Bold scraped Batu | 0.3 | ---do--- | 0.2 | 21.9 |
| 11 | ---do--- | No. 1 Singapore dammar | 0.3 | ---do--- | 0.1 | 14.1 |
| 12 | ---do--- | Singapore bold pale East India | 0.3 | ---do--- | 0.1 | 14.9 |
| 13 | ---do--- | Bold pale East India Macassar | 0.3 | ---do--- | 0.1 | 12.4 |
| 14 | ---do--- | Bold scraped black East India | 0.3 | ---do--- | 0.2 | 11.7 |
| 15 | I wood | Bold scraped Batu | 0.3 | ---do--- | 0.1 | 10.0 |
| 16 | ---do--- | | 1.0 | ---do--- | 0.1 | 9.8 |
| 17 | ---do--- | | 1.0 | ---do--- | 0.3 | 32— |
| 18 | Isomerized wood | | 1.0 | ---do--- | 2.4 | 25.7 |
| 19 | K wood neutralized with 2% sodium carbonate | Batavia dammar | 0.3 | ---do--- | 0.1 | 12.7 |
| 20 | H wood | Bold scraped Batu (saponified) | 0.3 | ---do--- | 0.2 | 21.7 |
| 21 | G gum | Bold scraped Batu | 0.3 | ---do--- | 0.4 | 19.3 |

EXAMPLE 22

Five parts of bold scraped Batu gum were added to 95 parts of K wood rosin and the mixture blended by heating at 150° C. for about 90 minutes under a nitrogen atmosphere. The mixture was then refluxed with 356 parts of acetone until solution was complete. The solution was then partially cooled and neutralized with 4 parts of sodium carbonate in 25 parts of water. The partially neutralized solution was then refluxed for about 1 minute and cooled. Only a slight precipitate of 3:1 salt formed on cooling.

EXAMPLE 23

Seventy-five parts of a solution, prepared by dissolving in 100 parts of acetone, 200 parts of K wood rosin which had been melted with 0.6 part of dammar gum, were dissolved with 189 parts of acetone and 17 ml. of 2 normal aqueous sodium hydroxide (about 8%) to partially neutralize it; no precipitate formed. This solution was then seeded with 3:1 salt and small sheets of duck, kraft pulp, and veneer were immersed in it for 1 minute. Each sheet was then passed through squeeze rolls and dried at 50° C. for 2 hours. The impregnated solution imparted stiffness to the pulp and paper and improved the heat and electrical insulating properties of the materials.

EXAMPLE 24

One hundred parts of a solution prepared by dissolving in 200 parts of acetone 200 parts of K wood rosin to which no dammar gum had been added, were dissolved with 143 parts of acetone and partially neutralized according to the manner set forth in Example 23. A precipitate of 3:1 salt formed.

The above examples illustrate the preparation of the improved impregnating and coating compositions of this invention containing a wood rosin size, water, a dammar gum, and a solvent. As shown in the examples, such compositions may be preferably prepared by blending the rosin and the dammar gum at such a temperature as will provide complete solution of the dammar in the rosin. The specific temperature employed will be determined by such factors as the melting point, miscibility of the rosin and dammar, etc. In the examples, the rosin and dammar were blended at 150° C., but in general any temperature within the range from about 100° C. to about 200° C. will be suitable. Dammar may be used without the prior blending step, but it is preferable to blend by preliminary fusion. As shown in the examples, it is preferred to carry out the blending operation in the presence of an inert atmosphere, such as nitrogen or carbon dioxide. If a partially neutralized rosin, such as K wood rosin, which has been neutralized with 2% sodium carbonate, is blended, nitrogen is preferably employed to provide the inert atmosphere. As shown in Example 21, the method of this invention is also suitable for inhibiting the formation of 3:1 salt and compositions prepared from gum rosins which have been subjected to treatment which produces substantial amounts of abietic acid in the gum rosin, and hence such gum rosins are to be deemed equivalent to wood rosin in this specification and in the claims.

The dammar gums which have been found effective in carrying out this process include Batavia dammar, Singapore dammar, pale dammar, bold pale East India Macassar dammar, black bold scraped East India dammar, bold scraped Batu gum (East India dammar), and the like. In the examples, 0.3–5.0% of dammar, based upon the weight of the rosin, was employed. In general, from about 0.1 to about 10% of dammar, and preferably from about 0.2 to about 2.0%, is used.

After the dammar has been dispersed in the rosin, the mixture is dissolved in a water-miscible alcohol. In the examples, acetone and 2B alcohol were employed, but in their place there may be used methyl alcohol, propyl alcohol, isopropyl alcohol, tertiary isobutyl alcohol, ethylene glycol, propylene glycol, methyl ethyl ketone, diethyl ketone, methyl Cellosolve, etc. In the examples, 100% of solvent, based upon the weight of the rosin, was used. The amount of solvent employed will depend upon the particular solvents chosen, upon the viscosity desired in the final mixture, and upon other factors. In general, however, from about 33 to about 800% of solvent, based upon the weight of the rosin, and preferably from about 50 to about 200%, is used.

The rosin is neutralized with an alkaline sodium compound in accordance with procedures well known in the art for the preparation of rosin sizes. In the examples, 2 normal sodium hydroxide was used. Other strengths of caustic soda may be employed, the final mixture being diluted with water if necessary to provide a solution having the required water content. Furthermore, in place of the sodium hydroxide shown in the examples, there may be used potassium hydroxide, potassium carbonate, sodium carbonate, sodium bicarbonate, etc. Twenty-five percent of the rosin was neutralized in the examples, but in general from about 10 to about 90% of the rosin may be neutralized in providing the coating and impregnating compositions of this invention.

In the examples, the solvent was added before the neutralization of the rosin. Alternatively, it is possible to prepare the compositions of this invention by partially neutralizing the rosin, and then adding the water-miscible solvent. Also, the compositions may be prepared by dissolving the dry size, prepared for example, as described in U. S. Patent 2,134,911 to Arthur C. Dreshfield and Henry A. Johnstone, in water, then adding the dammar gum and solvent. Other methods of preparing the compositions will be apparent to those skilled in the art of making rosin size.

The compositions prepared as described in this specification are useful for a variety of purposes. Thus, they may be employed as an impregnant for porous materials, such as wood, wallboard, paper, etc., to provide a material of increased structural strength, greater resistance to the flow of heat and electricity, etc. The compositions may also be utilized for the production of novel coatings and finished effects upon metal surfaces, plaster, etc. Difficulties due to 3:1 salt formation are entirely eliminated when the compositions of this invention are employed for impregnating and coating purposes.

What I claim and desire to protect by Letters Patent is:

1. A composition comprising a wood rosin which has been partially neutralized with an alkaline sodium compound selected from the group consisting of sodium hydroxide, sodium carbonate, and sodium bicarbonate to the extent of from about 10 to about 90%, from about 5 to about 50% of water, from about 0.1 to about 10% of a dammar gum, and from about 33 to about 800% of a water-miscible solvent selected from the group consisting of alcohols and ketones, the percentages being based upon the weight of the rosin in the composition.

2. A composition comprising a wood rosin which has been partially neutralized with an alkaline sodium compound selected from the group consisting of sodium hydroxide, sodium carbonate, and sodium bicarbonate to the extent of from about 10 to about 90%, from about 5 to about 50% of water, from about 0.1 to about 10% of a dammar gum, and from about 33 to about 800% of methyl alcohol, the percentages being based upon the weight of the rosin in the composition.

3. A composition comprising a wood rosin which has been partially neutralized with an alkaline sodium compound selected from the group consisting of sodium hydroxide, sodium carbonate, and sodium bicarbonate to the extent of from about 10 to about 90%, from about 5 to about 50% of water, from about 0.1 to about 10% of a dammar gum, and from about 33 to about 800% of ethyl alcohol, the percentages being based upon the weight of the rosin in the composition.

4. A composition comprising a wood rosin which has been partially neutralized with an alkaline sodium compound selected from the group consisting of sodium hydroxide, sodium carbonate, and sodium bicarbonate to the extent of from about 10 to about 90%, from about 5 to about 50% of water, from about 0.1 to about 10% of a dammar gum, and from about 33 to about 800% of acetone, the percentages being based upon the weight of the rosin in the composition.

5. A composition comprising a wood rosin which has been partially neutralized with sodium hydroxide to the extent of from about 10 to about 90%, from about 5 to about 50% of water, from about 0.1 to about 10% of a dammar gum, and from about 33 to about 800% of methyl alcohol, the percentages being based upon the weight of the rosin in the composition.

6. A composition comprising a wood rosin which has been partially neutralized with sodium hydroxide to the extent of from about 10 to about 90%, from about 5 to about 50% of water, from about 0.1 to about 10% of a dammar gum, and from about 33 to about 800% of ethyl alcohol, the percentages being based upon the weight of the rosin in the composition.

7. A composition comprising a wood rosin which has been partially neutralized with sodium hydroxide to the extent of from about 10 to about 90%, from about 5 to about 50% of water, from about 0.1 to about 10% of a dammar gum, and from about 33 to about 800% of acetone, the percentages being based upon the weight of the rosin in the composition.

8. The method which comprises forming a solution of from about 0.1 to about 10% of a dammar gum in a wood rosin, adding from about 33 to about 800% of a water-miscible solvent selected from the group consisting of alcohols and ketones, and neutralizing from about 10 to about 90% of the rosin with an alkaline sodium compound selected from the group consisting of sodium hydroxide, sodium carbonate and sodium bicarbonate.

9. The method which comprises forming a solution of from about 0.1 to about 10% of a dammar gum in a wood rosin, adding from about 33 to about 800% of a water-miscible solvent selected from the group consisting of alcohols and ketones, neutralizing from about 10 to about 90% of the rosin with an alkaline sodium compound selected from the group consisting of sodium hydroxide, sodium carbonate and sodium bicarbonate, and adding from about 5 to about 50% of water, based upon the weight of the rosin.

10. The method which comprises forming a solution of from about 0.1 to about 10% of a dammar gum in a wood rosin, adding from about 33 to about 800% of methyl alcohol, neutralizing from about 10 to about 90% of the rosin with an alkaline sodium compound selected from the group consisting of sodium hydroxide, sodium carbonate and sodium bicarbonate, and adding from about 5 to about 50% of water, based upon the weight of the rosin.

11. The method which comprises forming a solution of from about 0.1 to about 10% of a dammar gum in a wood rosin, adding from about 33 to about 800% of ethyl alcohol, neutralizing from about 10 to about 90% of the rosin with an alkaline sodium compound selected from the group consisting of sodium hydroxide, sodium carbonate and sodium bicarbonate, and adding from about 5 to about 50% of water, based upon the weight of the rosin.

12. The method which comprises forming a solution of from about 0.1 to about 10% of a dammar gum in a wood rosin, adding from about 33 to about 800% of acetone, neutralizing from about 10 to about 90% of the rosin with an alkaline sodium compound selected from the group consisting of sodium hydroxide, sodium carbonate and sodium bicarbonate, and adding from about 5 to about 50% of water, based upon the weight of the rosin.

13. The method which comprises forming a solution of from about 0.1 to about 10% of a dammar gum in a wood rosin, adding from about 33 to about 800% of methyl alcohol, neutralizing from about 10 to about 90% of the rosin with sodium hydroxide, and adding from about 5 to about 50% of water, based upon the weight of the rosin.

14. The method which comprises forming a solution from about 0.1 to about 10% of a dammar gum in a wood rosin, adding from about 33 to about 800% of ethyl alcohol, neutralizing from about 10 to about 90% of the rosin with sodium hydroxide, and adding from about 5 to about 50% of water, based upon the weight of the rosin.

15. The method which comprises forming a solution of from about 0.1 to about 10% of a dammar gum in a wood rosin, adding from about 33 to about 800% of acetone, neutralizing from about 10 to about 90% of the rosin with sodium carbonate, and adding from about 5 to about 50% of water, based upon the weight of the rosin.

JOSEPH N. BORGLIN.

CERTIFICATE OF CORRECTION.

Patent No. 2,335,908.  December 7, 1943.

JOSEPH N. BORGLIN.

It is hereby certified that error appears in the printed specification of the above numbered patent requiring correction as follows: Page 2, in the table, last column thereof, opposite Example 5, strike out the dash and insert instead --18.5--; same column, opposite Example 17, for "32-" read --32.7--; and that the said Letters Patent should be read with this correction therein that the same may conform to the record of the case in the Patent Office.

Signed and sealed this 1st day of February, A. D. 1944.

(Seal)

Henry Van Arsdale,
Acting Commissioner of Patents.